United States Patent [19]

Nakaguchi et al.

[11] 3,989,882

[45] Nov. 2, 1976

[54] PROCESS FOR PREPARING AN ALTERNATING COPOLYMER OF A CONJUGATED VINYL COMPOUND AND AN OLEFINIC UNSATURATED COMPOUND

[75] Inventors: Kohei Nakaguchi, Osaka; Shohachi Kawasumi, Kobe; Masaaki Hirooka, Ibaraki; Hiroshi Yabuuchi, Takatsuki; Hiroyoshi Takao, Ashiya, all of Japan

[73] Assignee: Sumitomo Chemical Company, Limited, Osaka, Japan

[22] Filed: Jan. 9, 1975

[21] Appl. No.: 539,911

Related U.S. Application Data

[60] Division of Ser. No. 320,909, Jan. 4, 1973, Pat. No. 3,894,997, which is a continuation-in-part of Ser. No. 3,559, Jan. 9, 1970, abandoned, which is a continuation of Ser. No. 560,857, June 27, 1966, abandoned.

[30] Foreign Application Priority Data

June 30, 1965  Japan.............................. 40-39488
July 10, 1965  Japan.............................. 40-41590

[52] U.S. Cl.............................. 526/188; 260/63 R; 260/79.5 R; 526/184; 526/185; 526/183; 526/187; 526/190; 526/196; 526/197; 526/291; 526/303; 526/329; 526/342; 526/343; 526/347; 526/350
[51] Int. Cl.²........................................ C08F 28/00
[58] Field of Search............... 260/80 C, 80 P, 86.3, 260/87.5 R, 63 R, 88.7 R, 85.5 R, 85.5 HA, 85.5 M, 86.7, 88.1 R, 79.7; 520/183, 184, 196, 188

[56] References Cited

UNITED STATES PATENTS

| | | | |
|---|---|---|---|
| 3,127,380 | 3/1964 | Welch.............................. | 260/85.5 |
| 3,326,870 | 6/1967 | Nakaguchi et al................. | 260/85.5 |
| 3,578,636 | 5/1971 | Nakaguchi et al.................. | 260/63 |
| 3,700,648 | 10/1972 | Hirooka et al.................... | 260/63 R |

OTHER PUBLICATIONS

Zutty and Welch, *J. Polymer Science*, 1960, 43, pp. 445–452.
Hirooka et al., *J. Polymer Science*, 1973, 11, pp. 1281–1306.

*Primary Examiner*—Joseph L. Schofer
*Assistant Examiner*—A. L. Clingman
*Attorney, Agent, or Firm*—Stevens, Davis, Miller & Mosher

[57] ABSTRACT

An alternating copolymer of an olefinic unsaturated compound and a conjugated vinyl compound is produced by contacting said monomers with at least one organoboron halide or/and a mixture of at least one organo-compound of metal from Groups IIb, IIIb and IVb of the Mendeleev Periodic Table and at least one halogeno-compound of metal from Groups IIIb and IVb of the Mendeleev Periodic Table. A typical catalyst is ethylboron dichloride or a combination of triethylaluminum and tin tetrachloride.

15 Claims, No Drawings

PROCESS FOR PREPARING AN ALTERNATING COPOLYMER OF A CONJUGATED VINYL COMPOUND AND AN OLEFINIC UNSATURATED COMPOUND

CROSS-REFERENCES TO RELATED APPLICATIONS

This is a divisional application of Ser. No. 320,909, filed Jan. 4, 1973, now U.S. Pat. No. 3,894,997, which in turn is a continuation-in-part application of application Ser. No. 3559 filed on Jan. 9, 1970, now abandoned, which is a streamlined continuation application of application Ser. No. 560,857 filed on June 27, 1966 now abandoned.

The present invention relates to a process for preparing a copolymer of a conjugated vinyl compound with an olefinic unsaturated compound. More particularly, it relates to a process suitable for preparing an alternating copolymer of acrylonitrile, an acrylic acid derivative or a thioacrylic acid derivative with an olefinic or halogen-containing olefinic unsaturated compound.

We have already found processes suitable for copolymerizing acrylonitrile, an acrylic acid derivative or a thioacrylic acid derivative with an olefinic or halogen-containing olefinic unsaturated compound, particularly, to selectively obtain an alternating compolymer. These processes include a process employing an organo-aluminum halide compound, and a process employing a combination of an organo-aluminium compound and a halogeno-aluminium compound and the like as the catalyst. Polymerization processes of this type have never been known and they have been referred to as "complexed polymerization." The noticeable characteristic of the polymerization was that an alternating copolymer can be selectively obtained. These are, for example, described in U.S. Pat. Nos. 3,326,870; 3,578,636; 3,647,771; 3,635,924 and 3,700,647.

On further research on this type of polymerization, we have found that the complexed polymerization can also be carried out by employing compounds of other metals than aluminium as a coordination catalyst. Thus, the present invention provides a process for preparing a copolymer of an olefinic unsaturated compound with a conjugated vinyl compound which comprises contacting an olefinic unsaturated compound having the following formula,

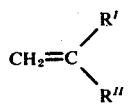

wherein $R'$ and $R''$ are independently hydrogen or a halogen atom, a hydrocarbon radical having one to twenty carbon atoms, a halogen-containing hydrocarbon radical having 1 to 20 carbon atoms or a substituted derivative thereof; and a conjugated vinyl compound selected from the group consisting of acrylonitrile and compounds having the following formula,

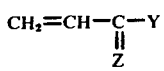

wherein Z is oxygen or sulfur atom, Y is a member selected from the group consisting of $Z'R$, $Z'H$, $Z'Me$, $NR'R''$ and R groups, and halogen and hydrogen atoms, $Z'$ is oxygen or sulfur atom, R is an organic radical having 1 to 20 carbon atoms, $R'$ and $R''$ are the same or different groups chosen from hydrogen atom and an organic radical having one to twenty carbon atoms, and may be bonded to each other at a place other than nitrogen, and Me is a representation of the monovalent part of an element from Groups I to III of the Mendeleev Periodic Table or an ammonium group; with a catalyst component (1) at least one organoboron halide having the formula,

wherein $R'''$ is an organic radical; X is a halogen atom; and n is an arbitrary number from 1 to 2; (2) a combination of at least two members selected from the groups having the following formulas, a. $BR'''_nX_{3-n}$ wherein $R'''$, X and n are as defined above,
b. $BR^{IV}_3$ wherein $R^{IV}$ is an organic radical, and
c. $BX'_3$ wherein $X'$ is a halogen atom; and (3) a combination of (a') at least one organo-compound of metal from Groups IIb, IIIb and IVb of the Mendeleev Periodic Table and (b') at least one halogeno-compound of metal from Groups IIIb and IVb of the Table, wherein at least one metal component of (a') and (b') is aluminium or boron, the metal components of (a') and (b') are different from each other and (a') must be contacted with (b') in the presence of at least the conjugated vinyl compound, and provides a process for preparing such a copolymer wherein the copolymerization reaction is carried out, if necessary, in the presence of oxygen or/and at least one organic peroxide. More specifically, the present invention provides a process for preparing an alternating copolymer of an olefinic unsaturated compound and a conjugated vinyl compound which comprises contacting at a temperature of from −150° C to +100° C an olefinic unsaturated compound having the following formula,

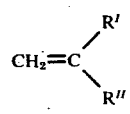

wherein $R'$ and $R''$ are independently hydrogen, a halogen atom, a hydrocarbon radical having 1 to 20 carbon atoms, or a halogen-containing hydrocarbon radical having 1 to 20 carbon atoms; and a conjugated vinyl compound selected from the group consisting of acrylonitrile and compounds having the following formula,

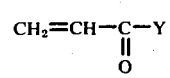

wherein Y is a member selected from the group consisting of $Z'R$, $Z'H$, $-Z'-_kMe'$, $NR'R''$ and R groups, and halogen and hydrogen atoms, $Z'$ is oxygen or sulfur atom; R is a hydrocarbon or halohydrocarbon radical having 1 to 20 carbon atoms, $R'$ and $R''$ are the same or different groups selected from the group consisting of hydrogen atom and a hydrocarbon or halohydrocarbon radical having 1 to 20 carbon atoms, and may be bonded to each other at a place other than nitrogen, and Me'' is an element from Groups I to II of the Mendeleev Periodic Table, wherein $k$ is equal to the valency of Me', or an ammonium group; with a catalyst selected from the group consisting of (1) at least one organo-boron halide having the formula, $$BR'''_n X_{3-n}$$

wherein R''' is a hydrocarbon radical having 1 to 20 carbon atoms, X is a halogen atom, and $n$ in an arbitrary value from 1 to 2, (2) a combination of at least two members selected from the groups having the following formulas, a. $BR'''_n X_{3-n}$ wherein R''', X and n are as defined above, b. $BR^{IV}_3$ wherein $R^{IV}$ is a hydrocarbon radical having 1 to 20 carbon atoms, and c. $BX'_3$ wherein X' is a halogen atom, and (3) a mixture obtained by contacting (a') at least one organo-metallic compound having the formula, $$MR^V_n X''_{p-n}$$

wherein M is a metal from Groups IIb, IIIb and IVb of Mendeleev's Periodic Table, $R^V$ is a hydrocarbon group having 1 to 20 carbon atoms, X'' is a halogen atom, $p$ is the valency of the metal and n is an arbitrary value of 1 to p; with (b') at least one halogeno-compound having the formula, $$M''X'''_m R^{VI}_{q-m}$$

wherein M'' is a metal from Groups IIIb and IVb of Mendeleev's Periodic Table. X''' is a halogen atom, $R^{VI}$ is a hydrocarbon radical having 1 to 20 carbon atoms, $q$ is the valency of the metal, and $m$ is an arbitrary value of 1 to $q$, in the presence of at least the conjugated vinyl compound, wherein at least one metal component of (a') and (b') is aluminum or boron and the metal components of (a') and (b') are different from each other; and wherein said catalyst is used in an amount of from 0.0005 to 10 moles per mole of said conjugated vinyl compound.

As catalyst systems having a combination of an organo-metallic compound and metal halides, the so-called Ziegler type catalysts have heretofore been known, which are represented by a combination of an organometallic compound of a metal from Groups I to III of the Mendeleev Periodic Table and a halogen compound of a transition metal from Groups IVa, Va and VIa of the same Table. However, catalyst systems of this type are effective only in the polymerization of lower α-olefins, and can provide little or no polymers in the polymerizaton of polar vinyl compounds. Research has been made on catalyst systems for the polymerization of polar vinyl compounds consisting of combinations of various organo-metallic compounds and various metal-halogen compounds, and some combinations have been found to be effective for obtaining the polymers of polar vinyl compounds. However, such catalyst systems usually have insufficient activity for lower α-olefins. It has, therefore, been considered to be impossible to get any catalyst system which is active for both polar vinyl compounds and lower α-olefins. Under the circumstances, it is quite surprising that copolymers of lower α-olefins with polar vinyl monomers can be produced at a sufficiently rapid rate with certain boron compounds or/and a combination of at least one organometallic compound and at least one metal-halogen compound according to the present invention. Further, the noticeable characteristic of the present invention is that alternating copolymers can be obtained in which the olefinic unsaturated compounds and the conjugated vinyl compounds are alternately bonded to each other at a ratio of 1 to 1. These alternating copolymers have never been heretofore obtained by any other processes than the complexed polymerization according to the present invention.

It has heretofore been known that alternating copolymers can be obtained by radical polymerization from some specific combinations of monomers such as, combinations of maleimide, fumaric acid chloride or the like with styrene, α-methylstyrene or the like. Some other similar combinations are also known, but it is common that it is very difficult for these known polymerization systems to give random copolymers even if the conditions are changed. On the other hand, it has been impossible to produce alternating copolymers from the combinations of monomers from which random copolymers have heretofore been obtained. However, according to the process of the present invention, not only alternating copolymers can be obtained from combinations of monomers from which copolymers have heretofore been impossible or very difficult to obtain, but it is also possible to selectively obtain alternating copolymers even from combinations of monomers from which random copolymers have heretofore been produced. This is one of the remarkable characteristics of the present invention.

It is another characteristic of the present invention that copolymers of a higher molecular weight can be obtained even from propylene, isobutylene, allyl halides and the like which have been considered to be substantially impossible to polymerize with any prior known radical catalysts owing to the occurrence of degradative chain transfer.

The coordination of a catalyst with the conjugated vinyl compound is important in the process of the present invention. The copolymerization reaction is considered to proceed through the formation of a complex of the organometal-halogen component with the conjugated vinyl compound. The presence of a metal, an organic group and a halogen is essential.

It is known that Ziegler catalysts have high activity if the active species are formed in the presence of monomers. Also, in the process of the present invention, particularly when a combination of an organo-compound of metal from Groups IIb, IIIb and IVb of the Mendeleev Periodic Table and a halogeno-compound of metal from Groups IIIb and IVb of the Table is employed, how to form active catalysts of this type is important. It is necessary in order to efficiently obtain alternating copolymers from these combinations to make the catalyst components mix and contact in the presence of at least the conjugated vinyl compound of the monomers employed. The copolymerization reaction is considered to proceed through a complex thus formed wherein the organometal-halogen component is coordinated with the conjugated vinyl compound.

Further, it is necessary that the metal component employed is aluminium or boron. The combinations of organometallic compounds and metal-halogen compounds from other metals than aluminium and boron are ineffective for producing alternating copolymers. The above-mentioned active metal components have the common characteristic in that they form the so-called electron-deficient molecule.

It has been known that the polymerization characteristic of a polar monomer is changed by the coordination of a metal halide with the polar monomer in radical polymerization. However, in copolymerization only random copolymers are always formed as in the prior art radical copolymerization. Thus, it is not due to only the coordination of a metal-halogen compound with a monomer that alternating copolymers can be obtained according to the present invention. This is a peculiarity of the present process.

Other specificities of the present process reside in that polar solvents are generally unsuitable in the process of the present invention although the polarity of the solvent does not usually have an essential effect on the polymerization reaction in the prior art radical polymerization processes, as well as that the presence of a metal, an organic group and a halogen is required as described above and that the combinations of monomers are limited. Solvents which form complexes with the metal compounds (including boron compounds) are particularly undesirable. For example, ethers such as ethyl ether, tetrahydrofuran, dioxane and the like, ketones such a acetone and the like, esters, and nitriles as well as dimethylformamide and the like cannot be employed in the present process, and alcohols and water are also unsuitable.

If the polymerization is carried out further in the presence of oxygen or/and at least one organic peroxide in the process of the present invention, the polymerization reaction is generally accelerated, or a relatively small amount of the catalyst employed will become sufficient to effectively carry out the polymerization. However, it is needless to say that alternating copolymers cannot be obtained merely by adding oxygen or an organic peroxide to a mixture of an olefinic unsaturated compound and a conjugated vinyl compound.

On the other hand, it is well known that polar monomers can be subjected to radical polymerization with a combination of a trialkylaluminium or trialkylboron and oxygen, but even catalyst systems of this type cannot provide alternating copolymers as obtained according to the process of the present invention. Therefore the process of the present invention is different from previous known radical polymerization reaction with organometallic compounds.

The halogens employed in $R^I$ and $R^{II}$ in the said olefinic unsaturated compound in the present invention are chlorine, bromine, iodine and fluorine. The hydrocarbon radicals and halogen-containing hydrocarbon radicals for $R^I$ and $R^{II}$ are preferably such radicals as alkyl, aryl, aralkyl, alkylaryl, cycloalkyl, etc. or those substituted by halogen. These compounds preferably include, for example, aliphatic α-olefins (including vinylidene compounds), aromatic α-olefins (styrene, substituted styrenes, other aromatic α-olefins), alicyclic α-olefins, vinyl halides, vinylidene halides and allyl halides.

Specific examples of these compounds include olefins such as ethylene, propylene, butene-1, isobutene, pentene-1, hexene-1, heptene-1, octene-1, 2-methyl-butene-1, 3-methyl-butene-1, 2-methyl-pentene-1, 4-methyl-pentene-1, 4-methyl-hexene-1, decene-1, do-decene-1, octadecene-1, 4-phenyl-butene-1, styrene, α-methylstyrene, α-butyl-styrene, β-methyl-styrene, m-methylstyrene, vinylcyclobutane, vinylcyclohexane, isopropenylbenzene, vinylnaphthalene, allylbenzene and the like; and halogen-containing olefinic unsaturated compounds such as vinyl chloride, vinyl bromide, vinyl iodide, allyl chloride, allyl bromide, allyl iodide, 4-chloro-butene-1, 3-chloro-butene-1, 3-bromo-pentene-1, 4,4,4-trichloro-butene-1, p-chlorostyrene, o-chlorostyrene, m-bromostyrene, p-iodostyrene, p-fluorostyrene, 4-chlorovinylcyclohexane, p-chloroallyl-benzene, 2,4-dichlorostyrene, 2,6-dichlorostyrene, 2,4-difluorostyrene, 3-trifluoromethylstyrene, 4-chloro-1-vinylnaphthalene, vinylidene chloride, vinylidene bromide, 2-chloropropene-1, 1-bromo-1-chloroethylene, 2-chloroallyl chloride, methallyl chloride, 1,1-bis(p-chlorophenyl)ethylene and the like. If these olefinic unsaturated compounds have e-values of not more than 1.0, particularly not more than 0.5, in the Q-e scheme proposed by Price-Alfrey, preferable results are obtained.

Representative examples to be employed as the said conjugated vinyl compounds include acrylonitrile, acrylic esters, thiolacrylic esters, thionacrylic esters, dithioacrylic esters, acrylamide, thioacrylamide, N-substituted acrylamides, N-substituted thioacrylamides, N,N-disubstituted acrylamides, N,N-di-substituted thioacrylamides, acrylolyl halides, thioacryloyl halides, acrylic acid, thiolacrylic acid, thionacrylic acid, dithioacrylic acid and salts thereof, acrolein, vinylketones, and the like. The organic radicals having 1 to 20 carbon atoms represented by R, R' and R'' above are preferably hydrocarbon or halohydrocarbon radicals. They may be, for example, alkyl, aryl, aralkyl, alkylaryl, cycloalkyl, and halogen-substituted thereof. Chlorine, bromine, iodine and fluorine may be employed as halogens. Me is a representation of the monovalent part of an element from Groups I to III of the Mendeleev Periodic Table or an ammonium group. Examples of the element are hydrogen lithium, sodium, potassium, rubidium, cesium, copper, silver, beryllium, calcium, strontium, barium, magnesium, zinc, cadmium, mercury, boron, aluminium and gallium. As used herein, the term "a representation of the monovalent part" means M'/2 in bivalent elements and M'/3 in trivalent elements wherein M' is a metal element from Groups I to III of the Mendeleev Periodic Table. In practice, therefore, the above formula is

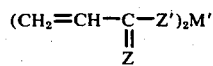

for bivalent elements, and

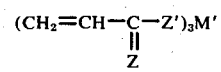

for trivalent elements. It is particularly preferable that it is a monovalent salt that is a salt of a Group I element or an ammonium salt. The definition that R' and R'' may be bonded to each other at a place other than nitrogen in NR'R'' means that a morpholino group, a pyrrolidino group, and a piperidino group, for example, may be included in NR'R''.

Specific examples of the conjugated vinyl compounds include methyl acrylate, ethyl acrylate, isopropyl acrylate, n-butyl acrylate, tert-butyl acrylate, n-amyl acrylate, n-octyl acrylate, n-dodecyl acrylate, tetradecyl acrylate, octadecyl acrylate, vinyl acrylate, allyl acrylate, phenyl acrylate, o-tolyl acrylate, benzyl acrylate, cyclohexyl acrylate, 2-chloroethyl acrylate, β-chlororoallyl acrylate, methyl thiolacrylate, ethyl thiolacrylate, isopropyl thiolacrylate, phenyl thiolacrylate, methyl thionacrylate, methyl dithioacrylate, acrylamide, thioacrylamide, N-methylacrylamide, N-ethylacrylamide, N-n-butylacrylamide, N-n-hexylacrylamide, N-n-octylacrylamide, N-2-ethylhexylacrylamide, N-n-dodecylacrylamide, N-stearylacrylamide, N-cyclohexylacrylamide, N-tolylacrylamide, N-methylthioacrylamide, N,N-dimethylacrylamide, N-methyl-N-ethylacrylamide, acrylyl morpholine, acrylyl pyrrolidine, N,N-dimethylthioacrylamide, acryloyl chloride, acryloyl bromide, acryloyl iodide, thioacryloyl chloride, acrylic acid, thiolacrylic acid, thionacrylic acid, dithioacrylic acid, sodium acrylate, potassium acrylate, zinc acrylate, aluminium acrylate, ammonium acrylate, acrolein, methyl vinyl ketone, ethyl vinyl ketone, phenyl vinyl ketone, cyclohexyl vinyl ketone, vinyl-[4-methylnaphthyl-(1)]-ketone, etc., but the conjugated vinyl compounds in the present invention are not limited to the above-mentioned compounds.

As the metal components in the organo-compounds of metals from Groups IIb, IIIb, and IVb of the Mendeleev Periodic Table in the present invention, there are mentioned zinc, cadmium, mercury, boron, aluminium, gallium, indium, thallium, germanium, tin and lead. Zinc, boron, aluminium and tin are preferably employed as the metal components. The organic groups are preferably hydrocarbon groups or substituted derivatives thereof, and the organometallic compounds containing alkyl, alkenyl, aryl, aralkyl, alkylaryl or cycloalkyl groups are particularly effective. The metals may contain other groups than the organic groups. The preferable organometallic compounds are represented by the following formula

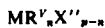

wherein M is a metal from Groups IIb, IIIb and IVb of the Mendeleev Periodic Table, $R^V$ is a hydrocarbon group having 1 to 20 carbon atoms or a substituted derivative thereof, $X''$ is a halogen, $p$ is the valency of the metal, and $n$ is an arbitrary value of 1 to $p$. The compounds wherein $n$ is equal to p are particularly effective. Of course, other organo-compounds of metals from Groups IIb, IIIb and IVb of the Mendeleev Periodic Table may be employed if necessary. Specific examples of these compounds include diethylzinc, diisobutylzinc, ethylzinc chloride, diethylcadmium, diethylmercury, diphenylmercury, trimethylboron, triethylboron, tributylboron, trihexylboron, tricyclohexylboron, triphenylboron, ethylboron bromide, trimethylaluminium, triethylaluminium, tripropylaluminium, tributylaluminium, trihexylaluminium, tridecylaluminium, trioctadecylaluminium, triphenylaluminium, tricyclohexylaluminium, tribenzylaluminium, vinylidiethylaluminium, diethylaluminium chloride, ethylaluminium sesquichloride, ethylaluminium dichloride, diethylaluminium fluoride, trimethylgallium, triethylgallium, triphenylgallium, triethylindium, tetraethylgermanium, tetramethyltin, tetraethyltin, tetraisobutyltin, dimethyldiethyltin, ethyl-n-propyldiisopentyltin, tetraphenyltin, tetrabenzyltin, diethyldiphenyltin, triethyltin chloride, trimethyltin bromide, diethyltin dichloride, ethyltin trichloride, tetramethyllead, tetraethyllead, dimethyldiethyllead, tetraphenyllead, triethyllead chloride, etc.

On the other hand, the halogeno-compounds of metals from Groups IIIb and IVb of the Mendeleev Periodic Table may be, for example, those of boron, aluminium, gallium, indium, thallium, germanium, tin and lead. The halogen may be any of chlorine, bromine, iodine and fluorine. These halogeno-metallic compounds may have other groups than halogens. The preferable halogeno-metallic compounds are represented by the following formula,

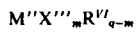

wherein $M''$ is a metal from Groups IIIb and IVb of the Mendeleev Periodic Table, $X'''$ is a halogen, $R^{VI}$ is a hydrocarbon group having 1 to 20 carbon atoms or a substituted derivative thereof, $q$ is the valency of the metal, and $m$ is an arbitrary value from 1 to $q$. If $m$ is equal to $q$, the compounds are apt to produce a good result. Of course, other metal halide compounds of metals from Groups IIIb and IVb of the Mendeleev Periodic Table may be employed if necessary. As the halogeno-metallic compounds useful in the present process, there are mentioned, for example, boron trichloride, boron trifluoride, boron tribromide, boron triiodide, ethylboron dichloride, phenylboron dichloride, diethylboron chloride, aluminium trichloride, aluminium tribromide, aluminium triiodide, partly fluorinated aluminium chloride, ethylaluminium dichloride, hexylaluminium dichloride, methylaluminium dibromide, ethylaluminium sesquichloride, diethylaluminium chloride, gallium trichloride, gallium dichloride, germanium tetrachloride, tin tetrabromide, tin tetraiodide, ethyltin trichloride, methyltin trichloride, phenyltin trichloride, p-chlorophenyltin trichloride, dimethyltin dibromide, diethyltin dichloride, diisobutyltin dichloride, didodecyltin dichlororide, diphenyltin dichloride, trimethyltin iodide, trimethyltin fluoride, triethyltin chloride, lead tetrachloride and diethyllead dichloride.

Preferable combinations of catalysts are selected from (a') alkyl compounds of aluminium, boron, zinc and tin and (b') halides of tin, aluminum and boron. A typical combination is of triethylaluminium and tin tetrachloride.

Hydrocarbon radicals are preferable as the organic radicals for $R'''$ and $R^{IV}$ in the boron compounds (1) and (2). The boron compounds containing alkyl, alkenyl, aryl, aralkyl, alkylaryl and cycloalkyl groups of 1 to 20 carbon atoms are particularly effective. Chlorine, bromine, iodine and fluorine are useful as the halogen component in the halogeno-boron compounds (1) and (2). Examples of the compounds having the formula,

include methylboron dichloride, ethylboron dichloride, ethylboron diiodide, ethylboron difluoride, butylboron dichloride, hexylboron dichloride, dodecylboron dichloride, phenylboron dichloride, tolylboron dichloride, benzylboron dichloride, cyclohexylboron dichloride, dimethylboron chloride, diethylboron chloride, diethylboron bormide, dipropylboron chloride, dibutylboron chloride, dipentylboron chloride, dihexylboron chloride, dioctylboron chloride, dioctadecylboron chloride, ethylvinylboron chloride, diphenylboron chloride, dicyclopentadienylboron chloride and dicylohexylboron chloride. These compounds may be used alone or in combination of two or more. Specific examples of the compounds having the formula, $$BR'''_3$$

include trimethylboron, triethylboron, tributylboron, trihexylboron, diethylphenylboron, diethyl-p-tolylboron, triphenylboron, tribenzylboron and tricyclohexylboron. As the compounds having the formula, $$BX'_3$$

there are mentioned boron trichloride, boron trifluoride, boron tribromide, and boron triiodide.

Especially, alkylboron compounds are preferable. These may be selected, for example, from the group consisting of diethylboron chloride, ethylboron dichloride, trichloroboron and triethylboron.

Alkylboron halides are especially preferable as the catalyst.

The organic peroxides employed in the present invention may be any organic compound having a peroxide bond such as diacyl peroxides, ketone peroxides, aldehyde peroxides, ether peroxides, hydroperoxides, dihydrocarbyl peroxides, peracid esters, percarbonates and percarbamates. Specific examples of these compounds include benzoyl peroxide, lauroyl peroxide, capryloyl peroxide, 2,4-dichlorobenzoyl peroxide, 4-nitrobenzoyl peroxide, 4-methoxybenzoyl peroxide, 4-chlorobenzoyl peroxide, acetyl peroxide, stearoyl peroxide, phthaloyl peroxide, methyl ethyl ketone peroxide, cyclohexanone peroxide, tert.-butyl hydroperoxide, p-menthane hydroperoxide, diisopropylbenzene hydroperoxide, cumene hydroperoxide, di-tert.-butyl peroxide, dicumyl peroxide, tert.-butyl perbenzoate, tert.-butyl perisobutyrate, tert.-butyl peracetate, tert.-butyl peroxypivalate, phenyl percarbamate, diisopropyl percarbonate and tert.-butyl periospropylcarbonate. However, the organic peroxides employed in the present invention are not limited to the above-mentioned compounds. There is a tendency for the promoting action of these peroxides to be elevated by increasing the radical decomposition rate of them.

In the practice of the present invention the catalyst may be employed at any ratio, but a ratio of from 0.0005, preferably 0.005, to 10 moles per mole of the conjugated vinyl compound is often employed. When a metal halide or an organo-metal halide and the conjugated vinyl compound are employed, for example, in equimolar amounts, an alternating copolymer can be generally obtained at a high yield. A large amount of the catalyst may also be employed. The use of more than 1.5 moles of the catalyst per mole of the conjugated vinyl compound provides substantially no additional advantages. Of course, the catalyst can be employed in an amount smaller than that of the conjugated vinyl compound. The molar ratio between the catalyst components is not limited. The molar ratios between the two components in the catalyst (2) $BR_nX_{3-n}$, $BR_3$ and $BX_3$, and between (3)(a') and (3)(b') may each preferably be 1 : 100 – 100 : 1. It is, however, undesirable to employ an extremely low concentration of the catalyst since its polymerization activity may drop at a concentration lower than a certain value. At a relatively low concentration of the catalyst, it is effective to carry out the polymerization in the presence of at least one organic peroxide or/and oxygen. This effect of the organic peroxide or/and oxygen is remarkable even at a lower temperature such as −78° C. The addition of oxygen or/and the organic peroxide at a lower temperature is particularly effective in the process of the present invention. These components are expected to have a sufficient effect in a relatively small amount. For example, the addition of about 0.001 to 20, preferably 0.01 to 5, mole percent of these components based on the conjugated vinyl compound is found to have an excellent promoting action. Of course, it is possible to employ these components at a higher or lower concentration. The concentration of oxygen or an organic peroxide may be from 0.01 to 100 mole percent based on said catalyst.

Although an alternating copolymer is generally obtained independently upon the composition of monomers, the rate of polymerization, yield, molecular weight and other properties of the polymer are often affected by the charge ratio of an olefinic unsaturated compound and a conjugated vinyl compound. Suitable charge ratios can be, therefore, determined depending upon specific objects. Generally, good results are apt to be obtained if an excess of the olefinic unsaturated compound is employed.

The polymerization temperature is not limited, but it may be preferably within the range from −150° C to 100° C. The polymerization activity in the present invention is generally so high that a sufficient yield may be obtained even at −78° C. Generally, the polymerization may be carried out under a pressure of up to 100 kg/cm².

In the practice of the present invention, it is possible to carry out bulk polymerization in liquid monomers or it is possible to employ an inert solvent. These solvents may be, for example, hydrocarbons or halogen-containing hydrocarbon compounds, such as propane, butane, pentane, hexane, heptane, octane, ligroin, petroleum ether, other petroleum mixture solvents, benzene, toluene, xylene, cyclohexane, methylcyclohexane, methylene dichloride, ethylene dichloride, trichloroethylene, tetrachloroethylene, butyl chloride, chlorobenzene and bromobenzene. As mentioned above, the compounds which form stable complexes with the catalyst compounds are undesirable as the solvents. It is particularly unsuitable to employ as solvents the compounds that form complexes with the catalyst having a stronger bond than that between the conjugated vinyl compound and the catalyst compound.

After the polymerization reaction, after-treatments are carried out according to conventional processes to purify and recover the polymer product. These after-treatment processes include, for example, an alcohol treatment, an alcohol-hydrochloric acid treatment, an aqueous hydrochloric acid treatment, an alkali treatment, etc. as well as any of other after-treatment processes employed in the prior art cation polymerization with a Lewis acid or the polymerization with a Ziegler-Natta type catalyst. However, the catalyst may also be separated and recovered from the polymer product, for example, by adding to the product a compound capable of forming a complex with the catalyst without decomposing the same.

The following examples illustrate the present invention and should not be construed as limiting the scope thereof.

EXAMPLE 1

A 300-ml, glass autoclave equipped with an electromagnetic stirrer was evacuated to vacuum and filled with nitrogen. In the atmosphere of nitrogen, 20 millimoles (1.8 ml at 20° C) of methyl acrylate was mixed with 20 millimoles of tin tetrachloride (4.0 ml of a 130 g/100 ml solution in toluene). When 25 ml of toluene was added to the resultant mixture, a light yellow clear solution was obtained. This solution was cooled to −78° C in a methanol-dry ice bath, where 200 millimoles (8.4 grams) of propylene was liquefied. 20 Millimoles of triethylaluminium (11.4 ml of a 20 g/100 ml solution in toluene) was added thereto with stirring, and the temperature of the mixture was immediately raised to 0° C. Polymerization was carried out at 0° C for 5 hours with stirring, and the internal pressure was then released. After adding a small amount of methanol thereto, the content was transferred into methanol and purified. The resultant white solid copolymer weighed 1.85 grams after vacuum drying at 50° C. The elementary analysis of this product gave a result corresponding to the calculated values for a 1:1 alternating copolymer.

Found C: 65.74%, H: 10.27%. Calculated C: 65.60%, H: 9.44%.

The yield of the copolymer as a 1:1 alternating copolymer was 72 percent based on methyl acrylate. The intrinsic viscosity of the copolymer was 2.46 dl/g, as measured with Ubbelohde's viscometer in benzene at 30° C.

EXAMPLE 2

A 200-ml four-necked flask equipped with a stirrer, a gas inlet tube, a gas exit tube, a dropping funnel and a thermometer was purged with nitrogen. 40 Millimoles of methyl acrylate, 40 millimoles of tin tetrachloride (as 130 g/100 ml toluene solution) and 50 ml of toluene were charged into the flask and cooled to −78° C. 800 Millimoles of propylene was liquefied therein and 40 millimoles of triethylaluminium (as 20 g/100 ml toluene solution) was added to the mixture. The gaseous phase was replaced by air with stirring. Polymerization was carried out for 1 hour while air was passed through the mixture. This polymerization gave 4.62 grams of a copolymer. The elementary analysis of the product gave a result corresponding to the calculated values for an alternating copolymer.

Found C: 65.36%, H: 9.83%.

The intrinsic viscosity of the copolymer was 1.60 dl/g, as measured in benzene at 30° C.

EXAMPLE 3

Into the same apparatus as in Example 1, 100 millimoles of methyl acrylate, 20 millimoles of tin tetrachloride, 400 millimoles of propylene, 20 millimoles of triethylaluminium and 5 millimoles of benzoyl peroxide were charged in this order. Toluene was then added thereto so that the total volume of the liquid might be 100 ml. Polymerization was carried out at 0° C for 1.5 hours. This polymerization gave 6.36 grams of a solid copolymer. The elementary analysis values of the product were as follows: C: 64.66%, H: 9.15%. When the toluene was replaced by xylene, chlorobenzene or n-butyl chloride under the same conditions, a similar copolymer was obtained at slightly different yields.

EXAMPLE 4

In the same apparatus as in Example 2, 40 millimoles of methyl acrylate, 40 millimoles of methyl acrylate, 40 millimoles of tin tetrachloride and 30 ml of toluene were mixed in the atmosphere of nitrogen and cooled to −78° C. 800 Millimoles of propylene and 40 millimoles of triethylaluminium were then added thereto. After adding to the mixture 3 drops of a solution of benzoyl peroxide in toluene having a concentration of 0.5 mol/l., polymerization was carried out for two minutes. The polymerization was stopped by pouring methanol into the flask, to obtain 5.00 grams of an alternating copolymer. The intrinsic viscosity of the product was 1.59 dl/g.

When the benzoyl peroxide was replaced by cumene hydroperoxide, di-tert.-butyl peroxide, methyl ethyl ketone peroxide or tert.-butyl perbenzoate under the same conditions, the reactions were promoted by these peroxides and similar copolymers were obtained.

EXAMPLE 5

In the same apparatus as in Example 2, 20 millimoles of methyl acrylate, 20 millimoles of tin tetrachloride and 25 ml of toluene were mixed in the atmosphere of nitrogen and cooled to −78° C. 400 Millimoles of propylene were liquefied therein. 20 Millimoles of trihexylaluminium was added to the mixture and polymerization was carried out for one hour while nitrogen gas containing 5 percent of oxygen was bubbled through the mixture. 1.18 Grams of a white solid copolymer was obtained. The elementary analysis of the product was as follows:

C: 65.28%, H: 10.07%.

It was observed that the product was an alternating copolymer.

EXAMPLE 6

In the same apparatus as in Example 1, 40 millimoles of methyl acrylate, 50 ml of toluene and 40 millimoles of tin tetrachloride were mixed in the atmosphere of nitrogen and cooled to −78° C, and 800 millimoles of propylene was liquefied therein. After adding 0.2 millimole of benzoyl peroxide and 20 millimoles of ethylaluminium sesquichloride ($Al_2Et_3Cl_3$) thereto, the temperature of the mixture was raised to 0° C. After 24 hours, the propylene was purged and the content was then treated with methanol. Thus, 4.11 grams of a white solid copolymer was obtained. The intrinsic viscosity of the product was 0.79 dl/g.

EXAMPLE 7

In the same apparatus as in Example 2, 20 millimoles of methyl acrylate, 20 millimoles of triethyltin chloride and 25 ml of toluene were mixed in the atmosphere of nitrogen and cooled to −78° C. 400 Millimoles of propylene was liquefied in the mixture and 20 millimoles of triethylaluminium was added thereto. After the gaseous phase was replaced by nitrogen gas containing 5 percent of oxygen, polymerization was carried out for one hour. Thus, 0.47 grams of an alternating copolymer was obtained.

EXAMPLE 8

In the same apparatus as in Example 1, 20 millimoles of methyl acrylate, 20 millimoles of diethyltin dichloride and 25 ml of toluene were mixed in the atmosphere of nitrogen and 200 millimoles of propylene was liquefied therein at −78° C. 20 Millimoles of triethylaluminium was added to the mixture and the temperature thereof was raised to 0° C. Polymerization was carried out for 5 hours. Thus, 0.23 grams of an alternating copolymer was obtained.

EXAMPLE 9

In the same apparatus as in Example 2, 45.6 millimoles of methyl acrylate, 45.6 millimoles of freshly distilled and purified aluminium bromide and 50 ml of toluene were mixed in the atmosphere of nitrogen and 912 millimoles of propylene was liquefied therein at −78° C. 45.6 Millimoles of triethylboron was added to the mixture. Polymerization was carried out for 1 hour at −78° C while nitrogen gas containing 5 percent of oxygen was passed through the mixture. Thus, 1.48 grams of an alternating copolymer was obtained. The elementary analysis of the product was as follows:
C: 65.14%, H: 9.37%.

EXAMPLE 10

Into the same apparatus as in Example 1, 31.4 millimoles of methyl acrylate was charged in the atmosphere of nitrogen and boron chloride gas was passed through the methyl acrylate so that an equivalent mole of the gas might be absorbed in the methyl acrylate. Further, 50 ml of toluene was added thereto and 628 millimoles of propylene was liquefied in the mixture at −78° C. Finally, 31.4 millimoles of tetraethyltin was added thereto and the temperature of the mixture was raised to 0° C and polymerization was carried out for 5 hours. Thus, 3.41 grams of a copolymer was obtained. The result of the elementary analysis of the product was as follows:
C: 65.41%, H: 9.36%.
The intrinsic viscosity of the product was 1.14 dl/g.

EXAMPLE 11

In the same apparatus as in Example 2, 40 millimoles of methyl acrylate, 40 millimoles of boron trichloride, 50 ml of toluene, 800 millimoles of propylene and 40 millimoles of triethylaluminium were mixed and polymerization was carried out at −78° C for 1 hour while nitrogen gas containing 5 percent of oxygen was passed through the mixture. This polymerization gave 3.02 grams of an alternating copolymer having an intrinsic viscosity of 1.73 dl/g. The elementary analysis of the product was as follows:
C: 65.73%, H: 9.46%.
When 40 millimoles of diethylzinc was substituted for the triethylaluminium under the same conditions, 2.33 grams of an alternating copolymer having an intrinsic viscosity of 1.66 dl/g was obtained. The elementary analysis of the product was as follows:
C: 65.46%, H: 9.25%.

EXAMPLE 12

In the same apparatus as in Example 2, 40 millimoles of gaseous boron trifluoride was absorbed in 40 millimoles of methyl acrylate, and 50 ml of toluene was added thereto, and the mixture was cooled to −78° C. Therein 800 millimoles of propylene was liquefied and 40 millimoles of triethylaluminium was added to the mixture. After replacing the gaseous phase by air, polymerization was carried out for 1.5 hours while air was passed through the mixture. Thus, 0.58 grams of a white copolymer was obtained.

EXAMPLE 13

Into the same 200 ml four-necked flask as in Example 2, 60 millimoles of methyl acrylate, 40 millimoles of tin tetrachloride, 50 ml of toluene, 1090 millimoles of isobutylene and 40 millimoles of triethylaluminium were charged in the atmosphere of nitrogen. Polymerization was carried out at −50° C for 1 hour while nitrogen gas containing 5 percent of oxygen was passed through the mixture. Thus, 6.70 grams of an alternating copolymer having an intrinsic viscosity of 1.02 dl/g was obtained. The elementary analysis of the polymer gave a result corresponding to the calculated values for an alternating copolymer.
Found C: 67.03%, H: 9.65%. Calculated C: 67.56%, H: 9.94%.

EXAMPLE 14

In the same apparatus as in Example 2, 40 millimoles of methyl acrylate, 40 millimoles of tin tetrachloride and 50 ml of toluene were mixed in the atmosphere of nitrogen. The mixture was cooled to −78° C and 400 millimoles of hexene-1 and 40 millimoles of triethylaluminium were added thereto and polymerization was carried out for 2 hours. Thus, 0.39 grams of an alternating copolymer was obtained. When polymerization was carried out at 50° C under the otherwise same conditions, the yield was 0.89 grams.

EXAMPLE 15

In the same apparatus as in Example 2, 40 millimoles of methyl acrylate, 40 millimoles of tin tetrachloride and 100 ml of toluene were mixed in the atmosphere of nitrogen and the mixture was cooled to −78° C. Thereto were added 80 millimoles of styrene and 40 millimoles of triethylaluminium, and the temperature of the mixture was raised to 0° C. Polymerization was carried out for one hour. Thus, 2.21 grams of a white copolymer having an intrinsic viscosity of 2.16 dl/g was obtained.

EXAMPLE 16

Into the same apparatus as in Example 2, 400 millimoles of methyl acrylate, 40 millimoles of tin tetrachloride, 50 ml of toluene, 400 millimoles of styrene and 40 millimoles of triethylaluminium were charged in this order. Polymerization was carried out at 0° C for 1 hour, while nitrogen gas containing 5 percent of oxygen was passed through the mixture. Thus, 10.77 grams of an alternating copolymer having an intrinsic viscosity of 5.50 dl/g was obtained. The elementary analysis of the polymer gave a result corresponding to the calculated values for a 1:1 alternating copolymer.
Found C: 75.65%, H: 7.55%; Calculated C: 75.76%, H: 7.41%.

EXAMPLE 17

Into the same apparatus as in Example 2, 40 millimoles of methyl acrylate, 40 millimoles of tin tetrachloride and 50 ml of toluene were charged in the atmosphere of nitrogen and the mixture was cooled to −78° C. Thereto were added 800 millimoles of vinyl chloride and 40 millimoles of triethylaluminium. When 10 l. of nitrogen gas containing 5 percent of oxygen was passed through the mixture of one hour, 4.13 grams of a white solid alternating copolymer was obtained. The elementary analysis of the polymer gave a result corresponding to the calculated values for a 1:1 alternating copolymer.

Found C: 48.24%, H: 5.82%, Cl: 26.15%; Calculated C: 48.50%, H: 6.10%, Cl: 23.86%.

EXAMPLE 18

When the procedures of Example 17 were repeated except that 80 millimoles of 2-chloro-propene-1 was substituted for the 800 millimoles of vinyl chloride, 4.18 grams of an alternating copolymer was obtained. The intrinsic viscosity of the polymer was 0.92 dl/g, as measured in benzene at 30° C. The elementary analysis of the product gave a result corresponding to the calculated values for an alternating copolymer.

Found C: 51.43%, H: 6.97%, Cl: 28.85%; Calculated C: 51.38%, H: 7.39%, Cl: 21.67%.

EXAMPLE 19

Into the same 100-ml four-necked flask as in Example 2, 20 millimoles of acrylonitrile was charged in the atmosphere of nitrogen and cooled to −78° C. Thereto were added 400 millimoles of vinylidene chloride and 30 millimoles of tin tetrachloride (as 130 g/100 ml solution in heptane), and the whole was well mixed. 20 Millimoles of triethylaluminium (as 20 g/100 ml solution in heptane) was slowly added thereto in about 20 minutes.

The temperature of this mixture was raised to 20° C and polymerization was carried out for 1.5 hours. Thus, 0.23 grams of an alternating copolymer was obtained. The elementary analysis of the polymer gave a result corresponding to the calculated values for a 1:1 alternating copolymer.

Found C: 39.66%, H: 3.60%, N: 7.81%, Cl: 48.27%; Calculated C: 40.00%, H: 3.33%, N: 9.33%, Cl: 47.27%.

EXAMPLE 20

Into the same apparatus as in Example 2, 40 millimoles of acrylonitrile was charged in the atmosphere of nitrogen and cooled to −78° C. 800 Millimoles of propylene was then liquefied therein. To the mixture was added 40 millimoles of tin tetrachloride (undiluted) and then 40 millimoles of triethylaluminium (as 20 g/100 ml solution in heptane), and polymerization was carried out for one hour. Thus, 0.54 grams of a white solid alternating copolymer was obtained. The nitrogen analysis of the polymer was 15.35 percent and corresponded to the calculated value of 14.72 percent for an alternating copolymer.

EXAMPLE 21

Into the same apparatus as in Example 2, 40 millimoles of acrylonitrile was charged in the atmosphere of nitrogen and cooled to −78° C. Thereto 800 millimoles of propylene, 40 millimoles of triethylaluminium (as 20 g/100 ml solution in toluene) and 40 millimoles of tin tetrachloride (as 130 g/100 ml solution in toluene) were added in this order, and polymerization was carried out for one hour. Thus, 0.29 grams of an alternating copolymer was obtained.

EXAMPLE 22

Into the same apparatus as in Example 2, 40 millimoles of acrylonitrile was charged in the atmosphere of nitrogen and 40 millimoles of boron trichloride was added thereto and the mixture was cooled to −78° C. To this mixture were added 800 millimoles of propylene and 40 millimoles of triethylaluminium (as 20 g/100 ml solution in heptane). Polymerization was carried out for 1 hour with stirring. Thus, 0.15 grams of an alternating copolymer was obtained, and the nitrogen analysis thereof was 15.38 percent.

EXAMPLE 23

In the same apparatus as in Example 2, 50 ml of toluene, 40 millimoles of n-butyl acrylate and 40 millimoles of tin tetrachloride were mixed in the atmosphere of nitrogen. The mixture was cooled to −78° C and 800 millimoles of propylene was liquefied therein. To this mixture was added 40 millimoles of triethylaluminium, and the gaseous phase was replaced by nitrogen gas containing 5 percent of oxygen. Polymerization was carried out for one hour while passing the gas through the mixture. Thus, 4.74 grams of an alternating copolymer having an intrinsic viscosity of 1.70 dl/g was obtained. The elementary analysis of the polymer gave a result corresponding to the calculated values for an alternating copolymer.

Found C: 70.00%, H: 10.01%; Calculated C: 70.55%, H: 10.66%.

EXAMPLE 24

When the procedures of Example 23 were repeated except that 40 millimoles of acrylamide was substituted for the n-butyl acrylate, 0.43 grams of a copolymer was obtained.

EXAMPLE 25

When the procedures of Example 23 were repeated except that 40 millimoles of N-ethylacrylamide was substituted for the n-butyl acrylate, 0.90 grams of a copolymer was obtained.

EXAMPLE 26

A 300-ml, glass autoclave equipped with a stirrer was evacuated to vacuum and filled with nitrogen. In the atmosphere of nitrogen, the autoclave was cooled to −78° C. Into this autoclave were charged 100 millimoles (8.6 grams) of methyl acrylate and 0.125 millimoles (30 mg) of benzoyl peroxide, 200 millimoles (8.4 g) of propylene was liquefied therein and the whole was thoroughly mixed. To this mixture was added 30 millimoles (3.6 g) of diethylboron chloride dissolved in 16.6 ml of toluene and the temperature of the mixture was raised to 0° C. After polymerization was carried out for 19 hours with stirring, the polymerization was stopped by adding methanol to the content. The resultant solid matter was treated with hydrochloric acid-methanol and then washed with methanol thoroughly. The product was dried at 50° C in vacuum. Thus, 11.45 grams of a white solid copolymer was obtained. This polymer was soluble in ethyl ether and was different from a homopolymer of methyl acrylate or a homopolymer of propylene. The elementary analysis of the polymer gave a result corresponding to the calculated values for a 1:1 alternating copolymer.

Found C: 64.56%, H: 9.23%; Calculated C: 65.60%, H: 9.44%.

The product was also regarded as a 1:1 copolymer from its infrared absorption spectrum. The intrinsic viscosity of the product was 1.21 dl/g as measured in benzene at 30° C.

When the methyl acrylate was replaced by ethyl acrylate, methyl thiolacrylate, N-ethylacrylamide, acryloyl chloride, sodium acrylate or methyl vinyl ketone, a similar copolymer was obtained. When the propylene was replaced by isobutylene, butene-1, vinyl chloride or vinylidene chloride, a similar good result was obtained.

EXAMPLE 27

A 100-ml, three-neck flask equipped with a stirrer was evacuated to vacuum and filled with nitrogen and cooled to −78° C. Into this flask were charged 7.55 millimoles (0.4 g) of acrylonitrile and 5 ml of heptane in the atmosphere of nitrogen. To this mixture was added 5.35 millimoles (0.5 g) of ethylboron dichloride, and the temperature of the mixture was raised to 0° C while the mixture was stirred. Thereto was added 14.4 millimoles (1.5 g) of styrene, and polymerization was carried out at 0° C for 19 hours. After the polymerization was stopped by adding methanol to the content, the same after-treatment as in Example 26 was carried out. Thus, 0.22 grams of a white solid copolymer was obtained. The nitrogen analysis value of the product was 8.63 percent and corresponded to the calculated value of 8.98 percent for a 1:1 alternating copolymer.

EXAMPLE 28

A 300-ml, glass autoclave equipped with a stirrer was evacuated to vacuum and filled with nitrogen. Into this autoclave was charged 40 millimoles of methyl acrylate in the atmosphere of nitrogen, and boron trichloride gas was then blown into the content to obtain a white methyl acrylate-boron trichloride complex. While this mixture was cooled to −78° C with dry ice-methanol, 810 millimoles of propylene was liquefied therein. To this mixture was then added 40 millimoles of triethylboron (19.6 ml of a 200 g/l. toluene solution). The whole of them was stirred at −78° C for 1 hour. Then, the temperature of the content was raised to room temperature, and polymerization was continued for three hours. After the polymerization was stopped by adding methanol to the content, an insoluble matter was washed with methanol and then dried at 50° C in vacuum. Thus, 0.24 grams of a white solid copolymer was obtained. The elementary analysis of the polymer gave a result corresponding to the calculated values for a 1:1 alternating copolymer.

Found C: 65.65%, H: 9.53%; Calculated C: 65.60%, H: 9.44%.

When boron trifluoride was substituted for the boron trichloride, a similar alternating copolymer was obtained.

What we claim:

1. In a process for preparing an alternating copolymer by copolymerizing an olefinic unsaturated compound having the formula,

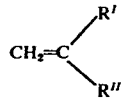

wherein $R^I$ and $R^{II}$ are independently hydrogen, a halogen atom, a hydrocarbon radical having 1 to 20 carbon atoms, or a halogen-containing hydrocarbon radical having 1 to 20 carbon atoms, and a conjugated vinyl compound selected from the group consisting of acrylonitrile and compounds having the formula,

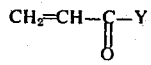

wherein Y is a member selected from the group consisting of Z'R, $-Z'$ $)_k$ Me', NR'R'' and R groups, and halogen and hydrogen atoms; Z' is an oxygen or sulfur atom; R is a hydrocarbon or halohydrocarbon radical having 1 to 20 carbon atoms; R' and R'' are the same or different groups selected from the group consisting of hydrogen atom and a hydrocarbon or halohydrocarbon radical having 1 to 20 carbon atoms, and may be bonded to each other at a place other than nitrogen; and Me' is an element from Groups I to II of the Mendeleev Periodic Table, wherein $k$ is equal to the valency of Me', or an ammonium group with a catalyst at a temperature of −150° C to +100° C, the improvement which comprises effecting the copolymerization by contacting the monomers with a catalyst mixture obtained by contacting (a') at least one organometallic compound having the formula,

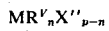

wherein M is a metal from Groups IIb, IIIb and IVb of Mendeleev's Periodic Table, $R^V$ is a hydrocarbon group having 1 to 20 carbon atoms, $X''$ is a halogen atom, $p$ is the valency of the metal and $n$ is an arbitrary value of 1 to $p$; with (b') at least one halogeno-compound having the formula,

wherein $M''$ is a metal from Groups IIIb and IVb of Mendeleev's Periodic Table, $X'''$ is a halogen atom, $R^{VI}$ is a hydrocarbon radical having 1 to 20 carbon atoms, $q$ is the valency of the metal, and $m$ is an arbitrary value of 1 to $q$, in the presence of at least the conjugated vinyl compound, wherein at least one metal component (a') and (b') is aluminum or boron and the metal components (a') and (b') are different from each other, said catalyst being used in an amount of from 0.0005 to 10 moles per mole of said conjugated vinyl compound and said components (a') and (b') being present in a molar ratio of 1:100 to 100:1.

2. A process according to claim 1, wherein the copolymerization is effected in the presence of oxygen or/and at least one organic peroxide.

3. A process according to claim 1, wherein said hydrocarbon and halogen-containing hydrocarbon radicals of said $R^I$ and $R^{II}$ are selected from the group consisting of alkyl, aryl, aralkyl, alkylaryl, cycloalkyl and halogen-substituted derivative thereof.

4. A process according to claim 1, wherein the organometallic compound (a') is an alkyl compound of aluminum, boron, zinc or tin and halogeno-compound (b') is a halide of tin, aluminum or boron.

5. A process according to claim 1, wherein $R^V$ and $R^{VI}$ are alkyl, alkenyl, aryl, aralkyl, alkylaryl or cycloalkyl having 1 to 20 carbon atoms.

6. A process according to claim 1, wherein the compound of the formula $MR^V{}_nX''{}_{p-n}$ is selected from the group consisting of diethylzinc, diisobutylzinc, ethylzinc chloride, diethylcadmium, diethylmercury, diphenylmercury, trimethylboron, triethylboron, tributylboron, trihexylboron, tricyclohexylboron, triphenylboron, ethylboronbromide, trimethylaluminium, triethylaluminium, tripropylaluminium, tributylaluminium, trihexylaluminium, tridecylaluminium, trioctadecylaluminium, triphenylaluminium, tricyclohexylaluminium, tribenzylaluminium, vinyldiethylaluminium, diethylaluminium chloride, ethylaluminium sesquichloride, ethylaluminium dichloride, diethylaluminium fluoride, trimethylgallium, triethylgallium, triphenylgallium, triethylindium, tetraethylgermanium, tetramethyltin, tetraethyltin, tetraisobutyltin, dimethyldiethyltin, ethyl-n-propyldiisopentyltin, tetraphenyltin, tetrabenzyltin, diethyldiphenyltin, triethyltin chloride, trimethyltin bromide, diethyltin dichloride, ethyltin trichloride, tetramethyllead, tetraethyllead, dimethyldiethyllead, tetraphenyllead, and triethyllead chloride; and wherein the compound of the formula $M''X'''_m R^{VI}_{q-m}$ is selected from the group consisting of boron trichloride, boron trifluoride, boron tribromide, boron triiodide, ethylboron dichloride, phenylboron dichloride, diethylboron chloride, aluminium trichloride, aluminium tribromide, aluminium triiodide, partly fluorinated aluminium chloride, ethylaluminium dichloride, hexylaluminium dichloride, methylaluminium dibromide, ethylaluminium sesquichloride, diethylaluminium chloride, gallium trichloride, gallium dichloride, germanium tetrachloride, tin tetrachloride, tin tetrabromide, tin tetraiodide, ethyltin trichloride, methyltin trichloride, phenyltin trichloride, p-chlorophenyltin trichloride, dimethyltin dibromide, diethyltin dichloride, diisobutyltin dichloride, didodecyltin dichloride, diphenyltin dichloride, trimethyltin iodide, trimethyl fluoride, triethyltin chloride, lead tetrachloride and diethyllead dichloride.

7. A process according to claim 1, wherein the organometallic compound (a') is trialkyl aluminum and the halogeno-compound (b') is tin tetrahalide.

8. A process according to claim 1, wherein said catalyst is present in an amount of from 0.005 to 10 moles per mole of said conjugated vinyl compound.

9. A process according to claim 1, wherein said catalyst is present in an amount substantially equimolar to the amount of said conjugated vinyl compound.

10. A process according to claim 2, wherein said oxygen or said organic peroxide is present in an amount of from 0.001 to 20 mole percent based on said conjugated vinyl compound.

11. A process according to claim 2, wherein said oxygen or said organic peroxide is present in amount of from about 0.05 to about 5 mole percent based on the amount of said conjugated vinyl compound.

12. A process according to claim 2, wherein said oxygen or said organic peroxide is present in an amount of from 0.01 to 100 mole percent based on said catalyst.

13. A process according to claim 1, wherein the polymerization is carried out under a pressure of up to 100 kg/cm².

14. A process according to claim 1, wherein said olefinic unsaturated compound is selected from the group consisting of an aliphatic α-olefin, an aromatic α-olefin, an alicyclic α-olefin, a vinyl halide, a vinylidene halide, an allyl halide, and said conjugated vinyl compound is selected from the group consisting of acrylonitrile, an acrylate, a thiolacrylate, an acrylamide, an acryloyl halide, acrylic acid, thiolacrylic acid, a salt of these acids, acrolein and a vinyl ketone.

15. A process according to claim 1, wherein said olefinic unsaturated compound is selected from the group consisting of propylene, isobutylene, styrene, α-methylstyrene, vinyl chloride, vinylidene chloride, and an allyl halide and said conjugated vinyl compound is selected from the group consisting of acrylonitrile, an acrylate, a thiolacrylate, acrylamide, an N-substituted acrylamide, an N,N-disubstituted acrylamide, an acryloyl halide and acrylic acid.

* * * * *